(12) United States Patent
Akahane et al.

(10) Patent No.: US 7,778,266 B2
(45) Date of Patent: Aug. 17, 2010

(54) SWITCH AND NETWORK FAULT RECOVERY METHOD

(75) Inventors: Shinichi Akahane, Hachioji (JP); Takahisa Miyamoto, Yokohama (JP)

(73) Assignee: Alaxala Networks Corporation, Kanagawa (JP)

( * ) Notice: Subject to any disclaimer, the term of this patent is extended or adjusted under 35 U.S.C. 154(b) by 699 days.

(21) Appl. No.: 11/703,074

(22) Filed: Feb. 7, 2007

(65) Prior Publication Data

US 2008/0025207 A1 Jan. 31, 2008

(30) Foreign Application Priority Data

May 30, 2006 (JP) .............................. 2006-149748

(51) Int. Cl.
  H04L 12/26 (2006.01)
  H04J 1/16 (2006.01)
  G08C 15/00 (2006.01)
  G06F 11/00 (2006.01)
  G01R 31/08 (2006.01)
(52) U.S. Cl. ...................... 370/419; 370/217; 370/242; 370/432
(58) Field of Classification Search ......... 370/217–223, 370/238–242, 390–392, 401–419; 709/224–249
  See application file for complete search history.

(56) References Cited

U.S. PATENT DOCUMENTS

| 6,330,229 | B1 * | 12/2001 | Jain et al. ................... 370/256 |
| 6,574,197 | B1 * | 6/2003 | Kanamaru et al. .......... 370/252 |
| 7,065,040 | B2 * | 6/2006 | Nagamine ................... 370/223 |
| 7,518,988 | B2 * | 4/2009 | Sekihata ..................... 370/222 |
| 7,567,564 | B2 * | 7/2009 | Tanaka ....................... 370/389 |
| 2004/0081083 | A1 | 4/2004 | Sekihata |
| 2005/0180448 | A1 * | 8/2005 | Kobayashi .................. 370/432 |
| 2006/0018253 | A1 * | 1/2006 | Windisch et al. ............ 370/216 |
| 2006/0215544 | A1 * | 9/2006 | Asa et al. .................... 370/216 |
| 2007/0230366 | A1 * | 10/2007 | Takatori ..................... 370/254 |
| 2008/0126536 | A1 * | 5/2008 | Sakurai ...................... 709/224 |
| 2009/0016214 | A1 * | 1/2009 | Alluisi et al. ............... 370/228 |
| 2009/0052317 | A1 * | 2/2009 | Takagi et al. ................ 370/223 |
| 2009/0103554 | A1 * | 4/2009 | Akahane et al. ............. 370/406 |

FOREIGN PATENT DOCUMENTS

JP 2004-147172 5/2004

* cited by examiner

*Primary Examiner*—M. Phan
(74) *Attorney, Agent, or Firm*—Mattingly & Malur, P.C.

(57) ABSTRACT

A first switch flashes an FDB upon receiving an FDB flash frame and then floods a multicast group join query message (QRY1). A terminal sends a group join message (RP1) back to the first switch. A second switch, a third switch and the first switch receive RP1 and perform IGMP/MLD snooping, respectively.

8 Claims, 23 Drawing Sheets

PRIOR ART

F I G . 8

| | DESTINATION MAC ADDRESS | OUTPUT PORT | | | 70 |
|---|---|---|---|---|---|
| E1 | MAC_MG1 | 40-2 | — | ... | |
| | ⋮ | ⋮ | ⋮ | ⋮ | |

71 = DESTINATION MAC ADDRESS column; 72 = OUTPUT PORT column

| | 70-1 |
|---|---|
| | DESTINATION MAC ADDRESS \| OUTPUT PORT |
| E1 | MAC_MG1 \| 40-2 \| — \| ... |
| | .. \| .. \| .. \| .. |

FIG. 11A

| | 70-2 |
|---|---|
| | DESTINATION MAC ADDRESS \| OUTPUT PORT |
| E1 | MAC_MG1 \| 40-21 \| — \| ... |
| | .. \| .. \| .. \| .. |

FIG. 11B

| | 70-3 |
|---|---|
| | DESTINATION MAC ADDRESS \| OUTPUT PORT |
| E1 | MAC_MG1 \| 40-32 \| — \| ... |
| | .. \| .. \| .. \| .. |

FIG. 11C

| | 70-4 |
|---|---|
| | DESTINATION MAC ADDRESS \| OUTPUT PORT |
| E1 | — \| — \| — \| ... |
| | .. \| .. \| .. \| .. |

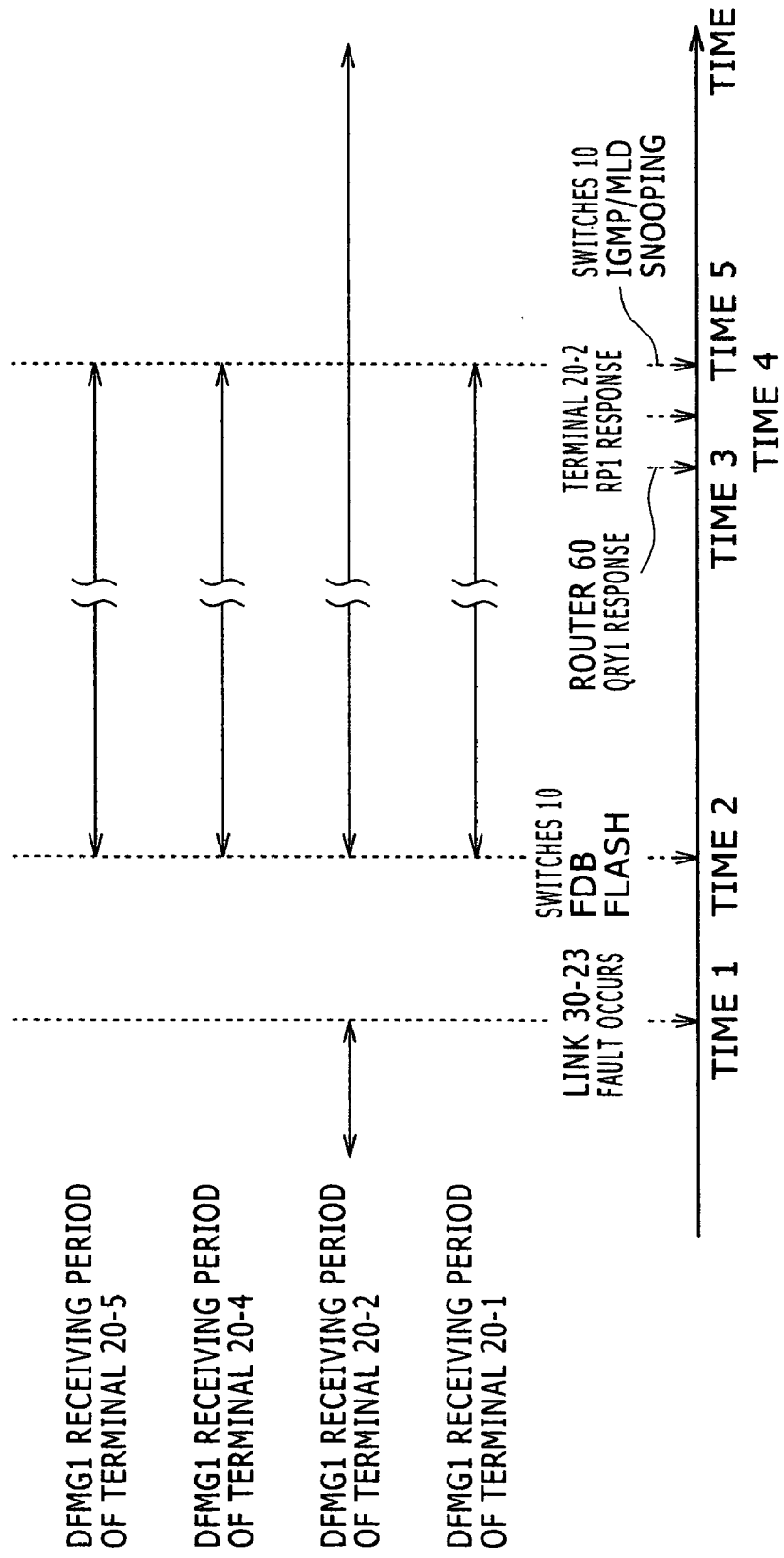

FIG. 17A

| DESTINATION MAC ADDRESS | OUTPUT PORT | ... |
|---|---|---|
| MAC_MG1 | 40-2 | .. |
| .. | .. | .. |

| DESTINATION MAC ADDRESS | OUTPUT PORT | ... |
|---|---|---|
| MAC_MG1 | — | .. |
| .. | .. | .. |

| DESTINATION MAC ADDRESS | OUTPUT PORT | ... |
|---|---|---|
| MAC_MG1 | 40-34 | .. |
| .. | .. | .. |

| DESTINATION MAC ADDRESS | OUTPUT PORT | ... |
|---|---|---|
| MAC_MG1 | 40-41 | .. |
| .. | .. | .. |

70-4, E1

US 7,778,266 B2

SWITCH AND NETWORK FAULT RECOVERY METHOD

CLAIM OF PRIORITY

The present application claims priority from Japanese patent application serial no. 2006-149748, filed on May 30, 2006, the content of which is hereby incorporated by reference into this application.

BACKGROUND OF THE INVENTION

1. Field of the Invention

The present invention relates to a switch and a fault recovery method. More particularly, the invention relates to a switch appropriate for use in a network including a ring network supporting multicast, and to a fault recovery method for a network.

2. Description of the Related Art

Referring to FIGS. 1 to 5, the L (layer) 2 ring protocol according to the related art of the present invention will be described. Here, FIG. 1 is a block diagram illustrating a ring network in normal operation. FIG. 2 is a block diagram illustrating the ring network immediately after occurrence of a fault. FIG. 3 is a block diagram illustrating the ring network in which communication is resumed while the fault continues to exist. FIG. 4 is a block diagram illustrating the network immediately after fault recovery. FIG. 5 is a block diagram of the ring network for illustrating the link switchback.

In FIG. 1, a ring network 100 includes four switches 10 and links (lines) 30 connecting between each of the switches. A switch 10-1 which is a master node of the ring network 100 periodically sends a health-check frame (indicated by HC in the figures) from a port 40-12. The switches 10 forming the ring forward the health-check frame from one to another adjacent switch 10 in the clockwise direction. The health-check frame is finally received by a port 40-14 of the switch 10-1. Here the port 40-14 of the switch 10-1 is in a BLK (Block) state for preventing occurrence of a loop, and can receive only the health-check frame. Sending and receiving are disabled for the port 40-14 in the BLK state, except for receiving the health-check frame (indicated by a black circle in the figures). A port 40-12 of the switch 10-1 is in a FWD (Forward) state in which sending and receiving is enabled (indicated by a white circle in the figures). In the following description, switches 10-2 to 10-4 other than the master node are referred to as transit nodes. Two ports not shown that form the ring of the transit nodes are both in the FWD state.

The switch 10-1 as the master node recognizes that the ring network 100 is healthy by receiving the health-check frame sent by the switch itself. Conversely, the switch 10-1 recognizes that the ring network 100 has a fault by not receiving the health-check frame within a predetermined period of time (namely, by delay of the health-check frame).

Here communications between a terminal 20-3 connected to the switch 10-3 and each of the terminals 20-1, 20-2 connected to the switch 10-1, are made as data frames (indicated by DF31 and DF32 in the figures) through the switch 10-2.

In FIG. 2, it is assumed that a fault occurs in a link 30-23 between the switches 10-3 and 10-2. The DF31 and DF 32 cannot pass through the link 30-23 in which the communications are disabled. Also the health-check frame periodically sent by the switch 10-1 cannot pass through the link 30-23 in which the communication is disabled.

In FIG. 3, the switch 10-1 recognizes that the ring network 100 has a fault by not receiving the health-check frame in a predetermined period of time. Upon detection of the fault, the switch 10-1 moves the port 40-14 from the BLK state to the FWD state. The switch 10-1 sends FDB flash frames (FF1, FF2) from its ports 40-12, 40-14 in both directions. The switches 10-2 to 10-4 receive the FDB flash frames, each of which flashes (clears) a corresponding entry of the holding FDB (Forwarding Database). The switch 10-1 also flashes (clears) the contents of the holding FDB.

As the corresponding entries of the FDBs are flashed, the communications between the terminal 20-3 connected to the switch 10-3 and each of the terminals 20-1, 20-2 connected to the switch 10-1 are flooded by the switches 10-3 and 10-4, and then reach the switch 10-1. Thus the communications are resumed. The switches 10-3 and 10-4 learn the new communication paths (from the terminal 20-3 to the switch 10-3, switch 10-4, switch 10-1, and to the terminal 20-1 as well as to the terminal 20-2) which are then recorded in the FDBs. As a result, the flooding of the switches 10-3 and 10-4 is completed.

Incidentally the health-check frame periodically sent by the switch 10-1 continues the communication disabled state. Further, although the new paths are established between the switches 10-3 and 10-1, there is no change between the switches 10-2 and 10-1, so that the FWD state of the port 40-12 of the switch 10-1 is continued.

In FIG. 4, when the fault of the link 30-23 is recovered, the switch 10-1 receives the health-check frame periodically sent by the switch 10-1, and detects recovery of the ring network 100.

In FIG. 5, upon detection of the recovery of the ring network 100, the switch 10-1 sends the FDB flash frames from its ports 40-12, 40-14 in both directions. The switch 10-1 moves the port 40-14 from the FWD state to the BLK state. The switches 10-2 to 10-4 receive the FDB flash frames, each of which flashes (clears) a corresponding entry of the holding FDB. The switch 10-1 also flashes (clears) the contents of the holding FDB.

As the FDBs are flashed, the communications between the terminal 20-3 connected to the switch 10-3 and each of the terminals 20-1, 20-2 connected to the switch 10-1 are flooded in the switches 10-1 to 10-4, and then reach the port 40-12 of the switch 10-1. Thus the communications are resumed. The communications also reach the port 40-14 of the switch 10-1. However the port 40-14 cannot receive because it is in the BLK state. The switches 10-1 to 10-3 learn the communication paths (from the terminal 20-3 to the switch 10-3, switch 10-2, switch 10-1, and to the terminal 20-1 as well as to the terminal 20-2) which are then recorded in the FEBs. As a result, the flooding of the switches 10-1 to 10-4 is completed.

Next, IGMP (Internet Group Management Protocol)/MLD (Multicast Listener Discovery) snooping will be described with reference to FIGS. 6 to 9. Here IGMP is a multicast path control protocol of IPv4, and MLD is a multicast path control protocol of IPv6. Further snooping is that L2 refers to the L3 protocol. Here FIGS. 6 and 8 are views each illustrating the FDB before and after snooping. FIGS. 7 and 9 are block diagrams of a network for illustrating IGMP/MLD snooping.

In FIG. 6, an FDB 70 of the switch includes a destination MAC address 71 and an output port 72. It is possible to register a plurality of entries to the FDB 70. However, the figure shows the FDB 70 before snooping, so that there is no entry for the destination MAC address 71 and output port 72 (indicated by "-" in the figures).

In FIG. 7, a network 200 includes a server 50, a router 60, and a switch 10-11 that are linearly provided in the cited order. There are connected a terminal 20-11 to a port 40-1 of the switch 10-11 and a terminal 20-12 to a port 40-2 of the switch 10-11. The router 60 sends a group join query message (Query Frame, indicated by QRY1 in the figures) downstream. The FEB 70 is empty at this time (FIG. 6), so that the switch 10-11 floods the message and transfers QRY1 to the terminals 20-11 and 20-12. Here, only the terminal 20-12 sends a group join message (Report, indicated by RP1 in the figures) to the router 60 in response to QRY1. The switch 10-11 receives RP1. The switch 10-11 writes a multicast group MAC address (denoted by MAC_MG1) stored in the received RP1, to the destination MAC address 71 of the FDB 70. Similarly the switch 10-11 writes a received port number (denoted by 40-2) at which RP1 is received, to the output port 72. FIG. 8 shows the FDB 70 after snooping.

In FIG. 9, a data frame (indicated by MDF1 in the figure) addressed to the multicast group (destination MAC address: MAC_MG1) is output from the server 50 and is received through the router 60. Then the data frame is sent only to the port 40-2 based on the FDB 70 in FIG. 8.

JP-A No. 147172/2004 describes a ring switching method for reducing switching time due to a fault in the layer 2 network of ring structure.

SUMMARY OF THE INVENTION

With a combination of the above described ring network in which fault recovery is performed and the above described IGMP/MLD snooping, when a fault occurs in the ring network, the nodes continue the flooding until the next listener discovery message arrives, causing an increase of unnecessary traffic and degradation of security over a long period of time.

The above described problem can be solved by a switch including: a packet forwarding processing unit that accumulates a received frame, extracts header information from the frame to send to a packet classifying unit, receives an output port from the packet destination decision unit, and sends the accumulated frame from the output port; the packet classifying unit that decides a type of the frame based on the header information, extracts a destination MAC address from the header information, and sends to the packet destination decision unit; a data base that maps the destination MAC address and the output port; and the packet destination decision unit that decides the output port from the data base by use of the destination MAC address received from the packet classifying unit and sends to the packet forwarding processing unit. In addition the switch has a generation unit that generates a listener discovery message. With such a configuration, the switch flashes an entry of the data base upon detection of a fault in a downstream network and sends a listener discovery message to the downstream network.

Further the problem can be solved by a switch that connects a server on an upstream side and forms a node of a ring network on a downstream side. With such a configuration, the switch forwards a multicast frame sent from the server to a multicast group, to the ring network by searching the data base that maps a destination MAC address and an output port, flashes an entry of the data base upon detection of a fault in the ring network, and sends a listener discovery message to two adjacent switches forming the ring network.

Further the problem can be solved by a fault recovery method for a network having a first switch, a second switch, and a third switch connected in a ring shape to provide a service, which is provided by a server connected to the first switch, to a terminal connected to any of the plurality of switches. The network fault recovery method includes the steps of: detecting a fault in interconnection by any one of the plurality of switches; sending data base flash frames in two directions by the switch having detected the fault; flashing entries of data bases by the plurality of switches; and sending a listener discovery message to the second and third switches from the first switch.

BRIEF DESCRIPTION OF THE DRAWINGS

FIG. 8 is a view illustrating the FDB after snooping;

FIGS. 11A to 11D are views illustrating the FDBs of the switches after snooping;

FIGS. 13A to 13D are views illustrating the FDBs of the switches after flashing;

FIG. 14 is a timing chart illustrating the receiving periods of the terminals;

FIGS. 17A to 17D are views of the FDBs of the switches after execution of IGMP/MLD snooping;

DETAILED DESCRIPTION OF INVENTION

Figure 1:
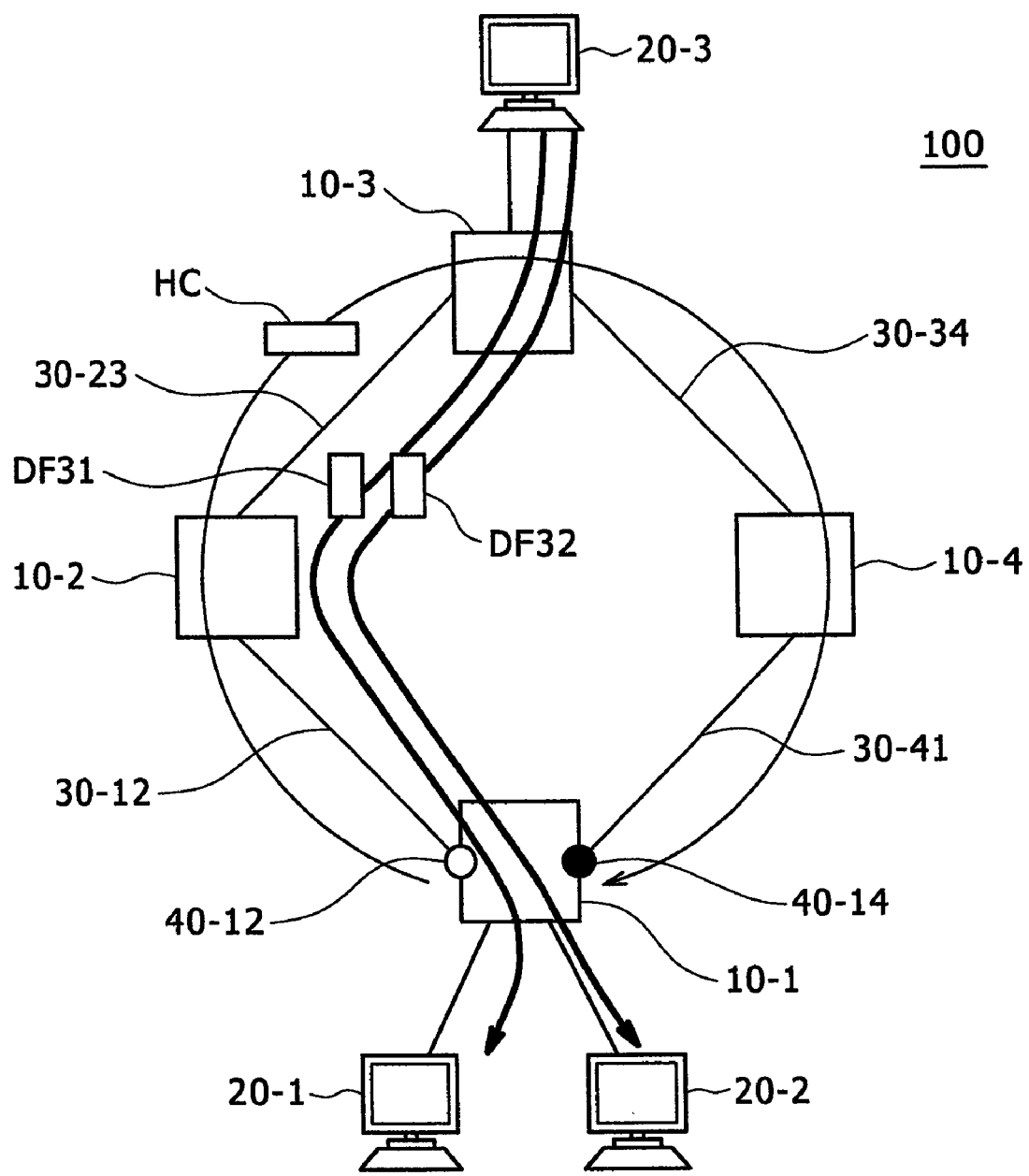
FIG. 1 is a block diagram illustrating a ring network in normal operation.
Figure 2:
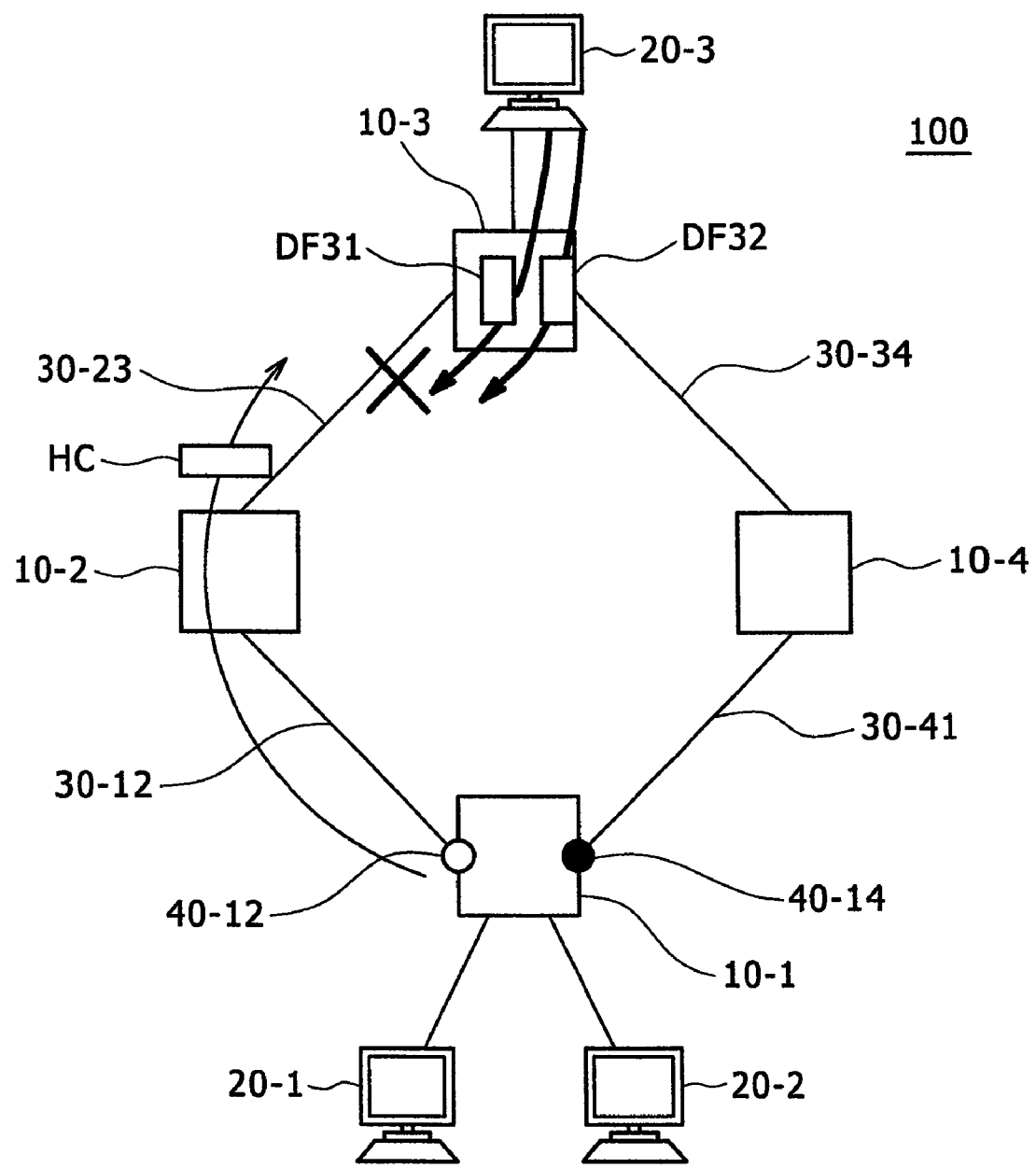
FIG. 2 is a block diagram illustrating the ring network immediately after occurrence of a fault.
Figure 3:
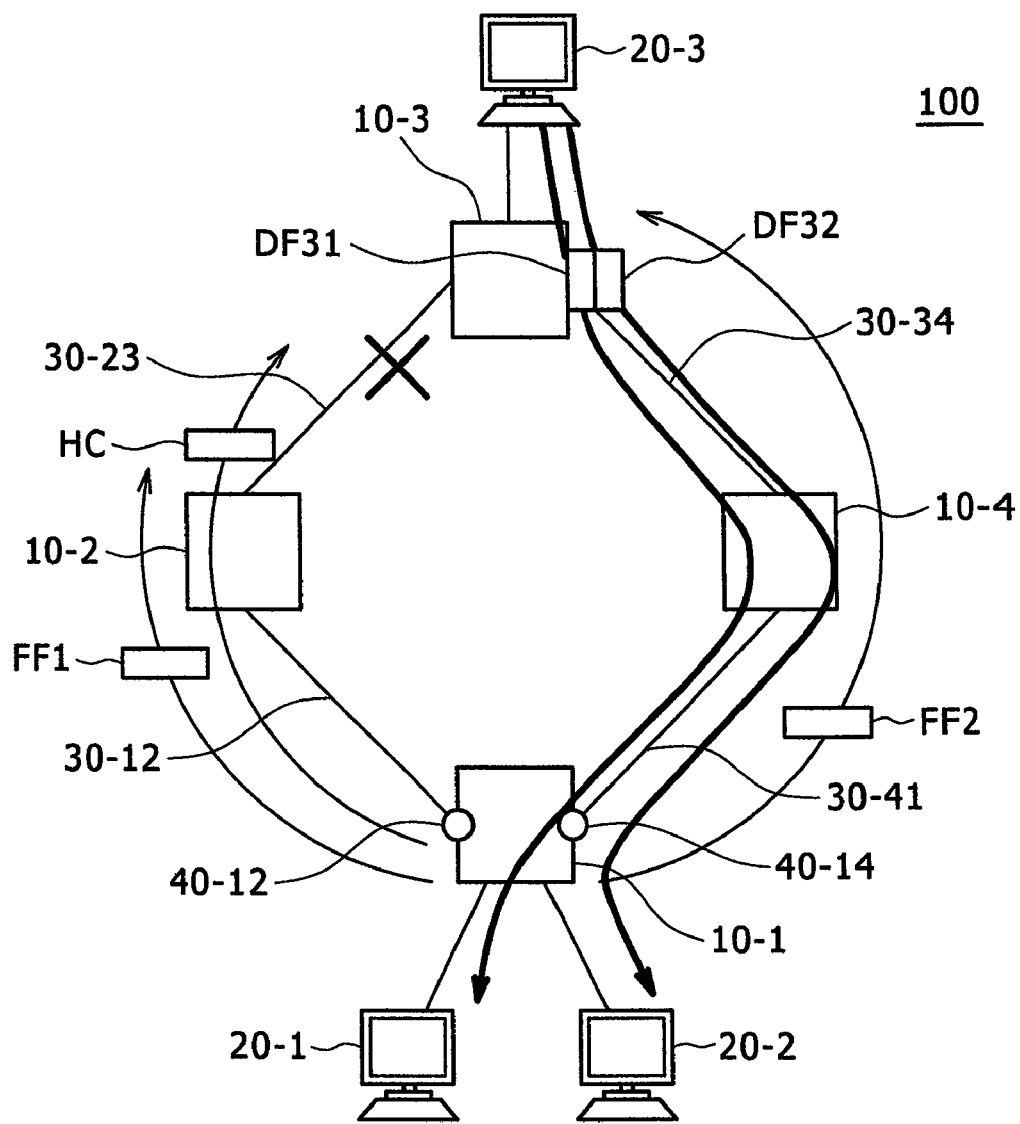
FIG. 3 is a block diagram illustrating the ring network in which communication is resumed while the fault continues to exist.
Figure 4:
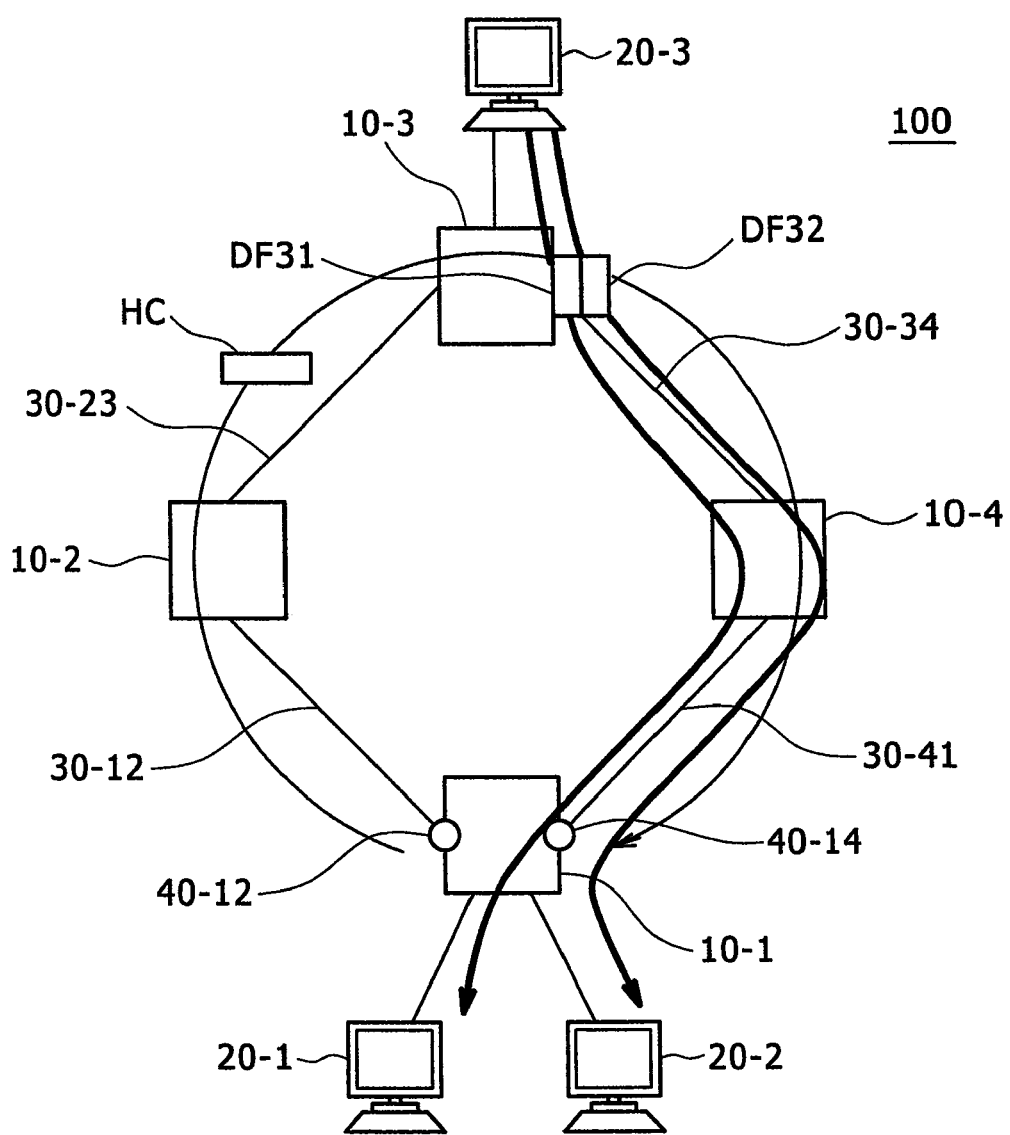
FIG. 4 is a block diagram illustrating the ring network immediately after fault recovery.
Figure 5:
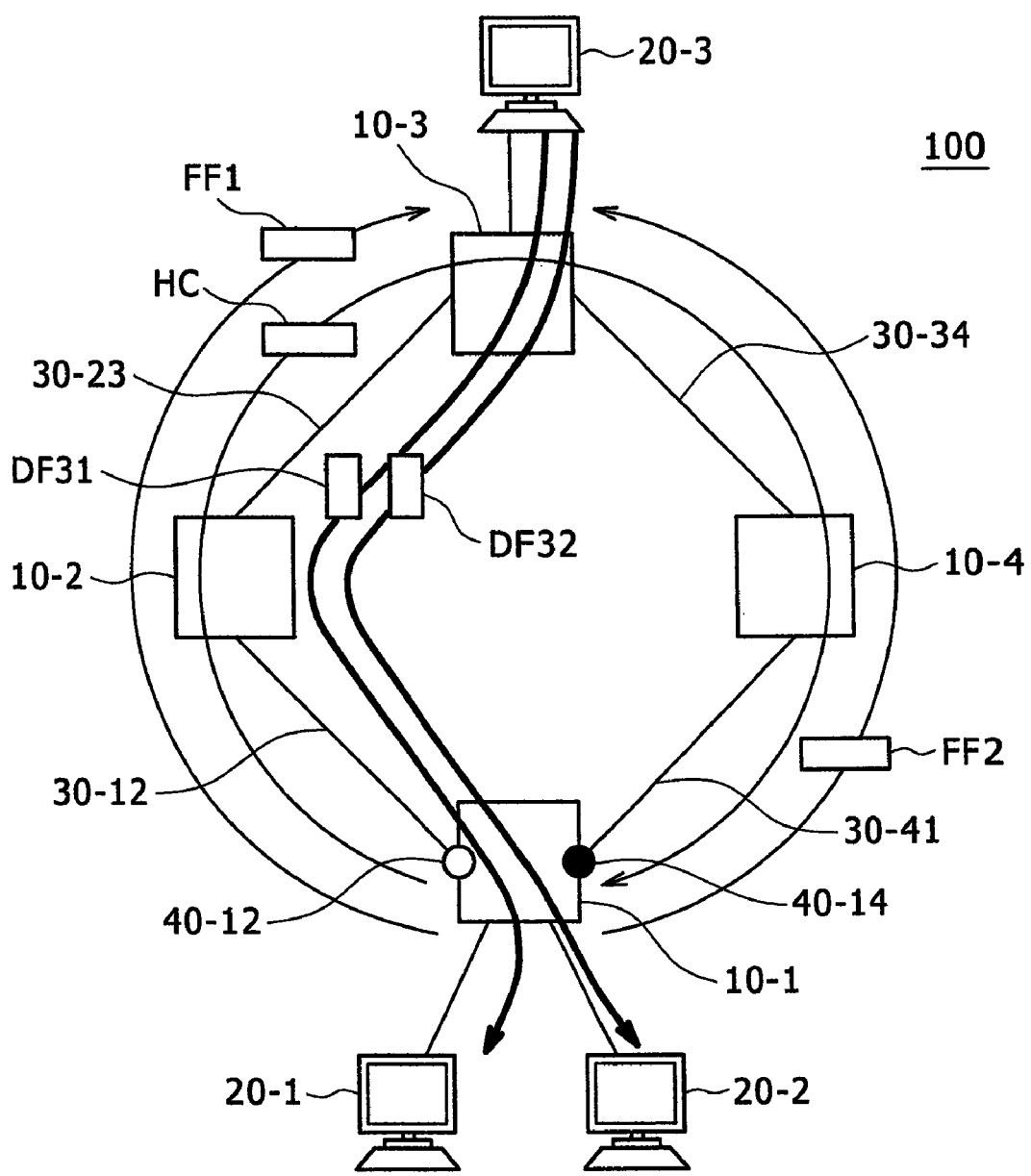
FIG. 5 is a block diagram of the ring network for illustrating the link switchback.
Figure 6:
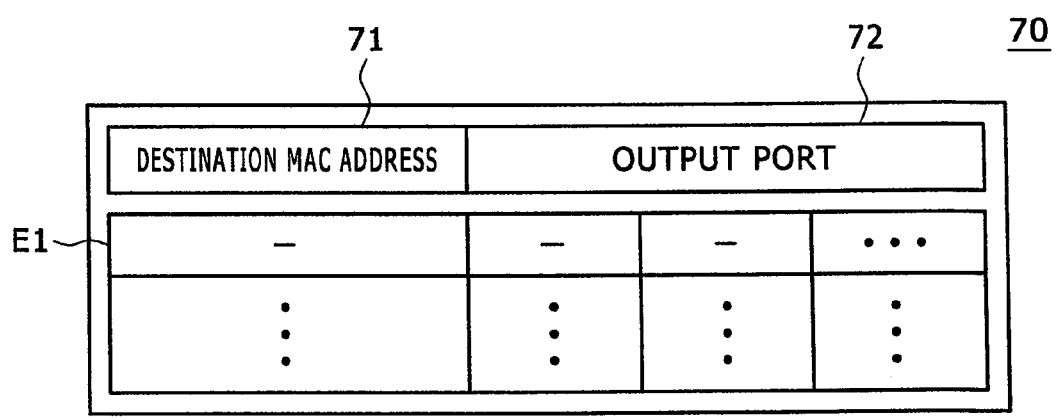
FIG. 6 is a view illustrating an FDB before snooping.
Figure 7:
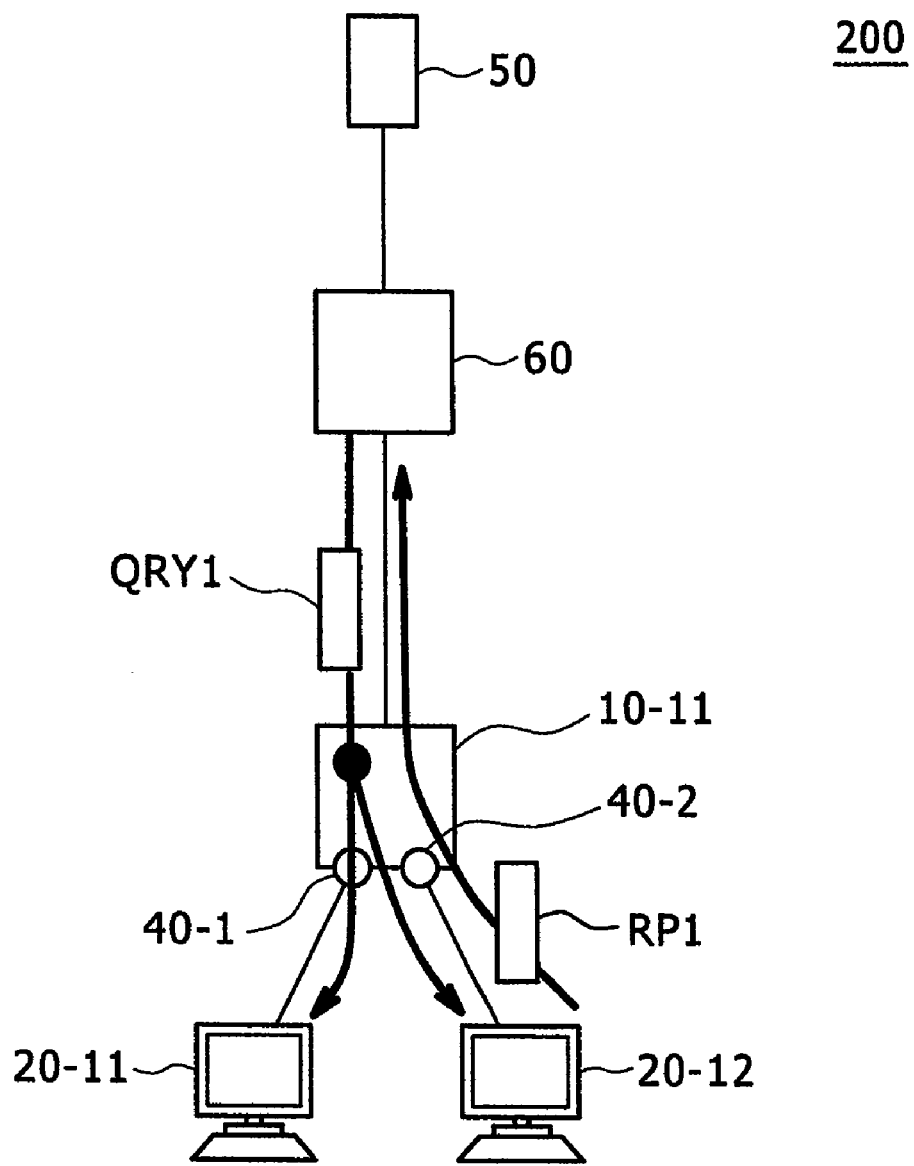
FIG. 7 is a block diagram of a network for illustrating IGMP/MLD snooping.
Figure 9:
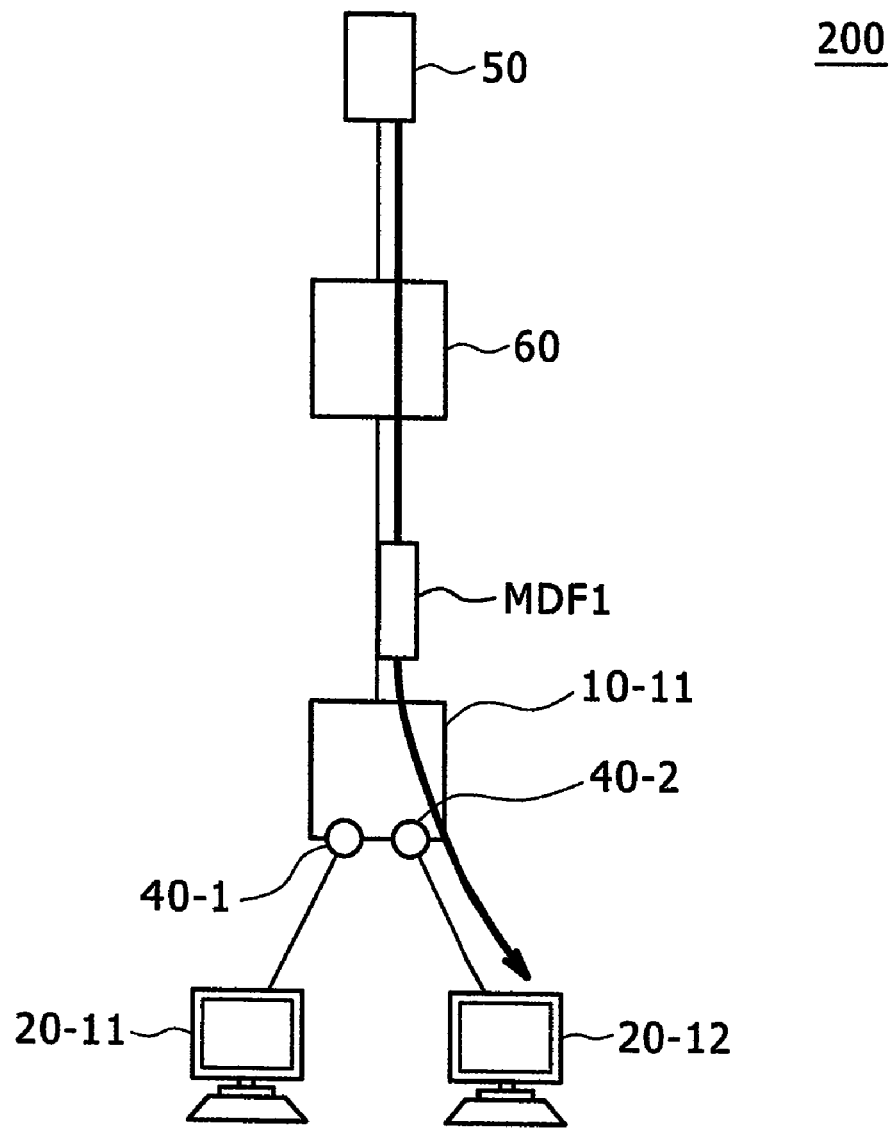
FIG. 9 is a block diagram of the network for illustrating IGMP/MLD snooping.

Hereinafter a mode for carrying out the present invention will be described based on an embodiment with reference to the accompanying drawings. Like components are denoted by like reference numerals and their description will not be repeated.

Figure 10:
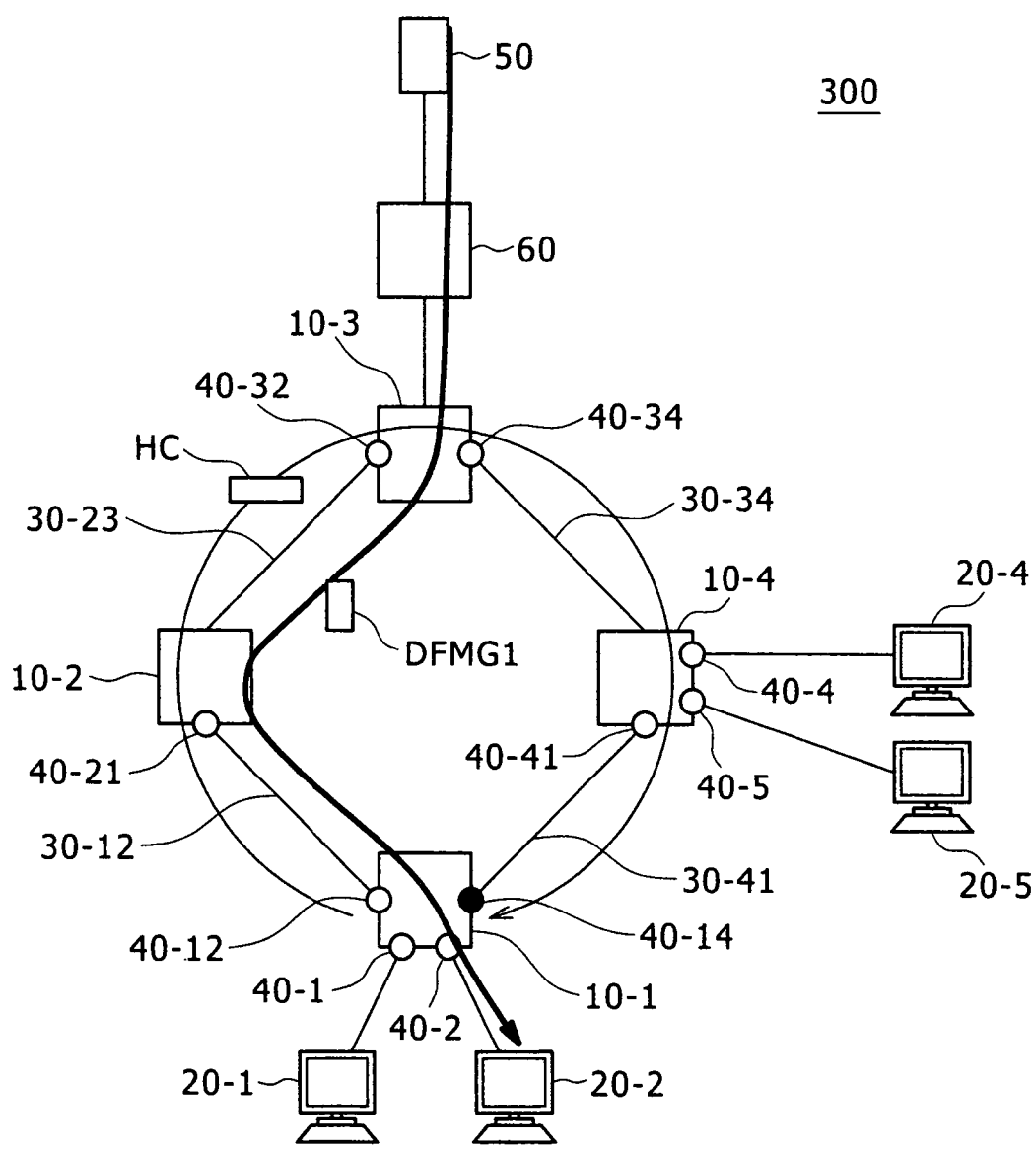
FIG. 10 is a block diagram illustrating a ring network to which IGMP/MLD snooping is applied in normal operation.
Figure 12:
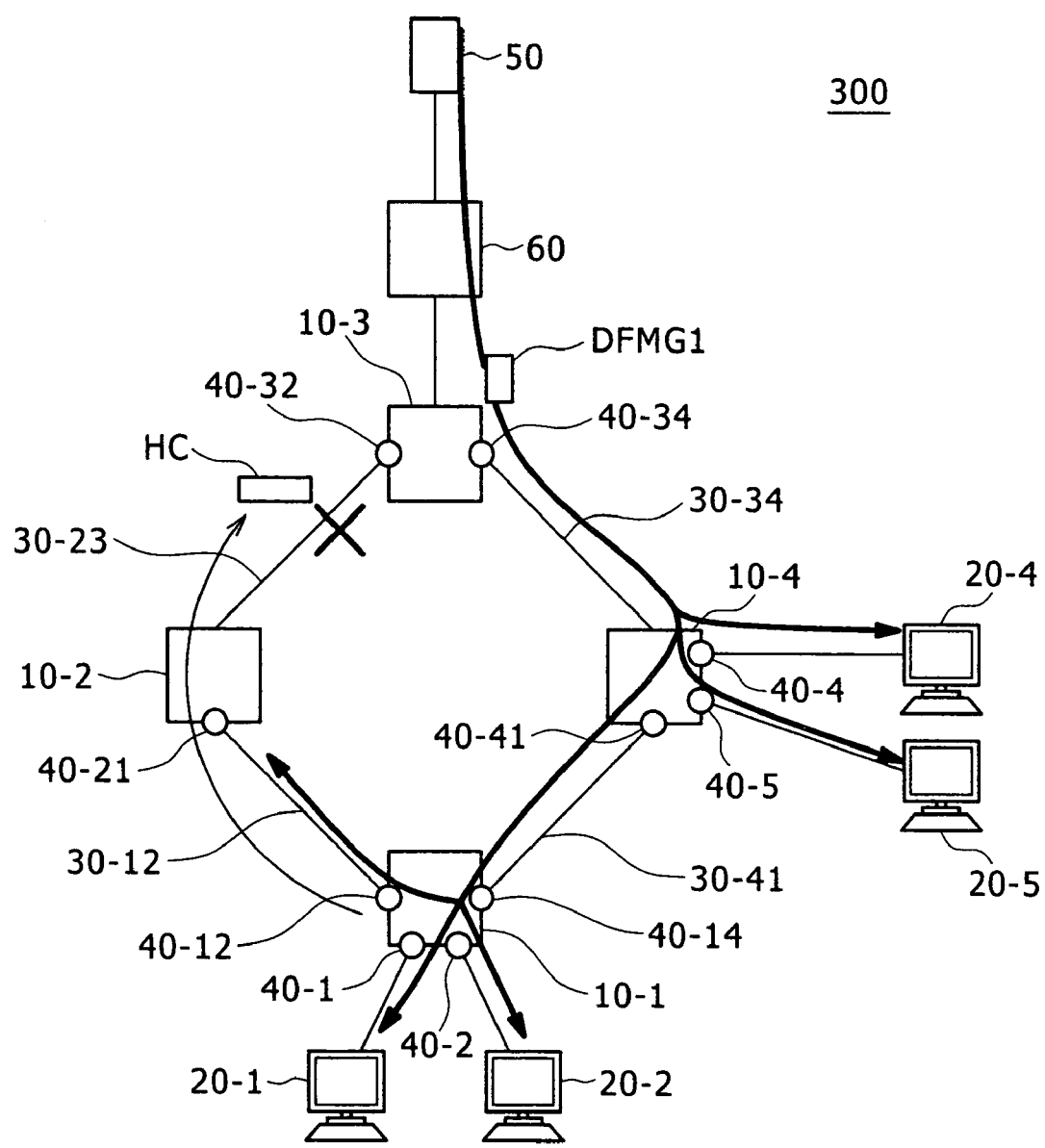
FIG. 12 is a block diagram illustrating the ring network to which IGMP/MLD snooping is applied immediately after occurrence of a fault.

First, referring to FIGS. 10 to 14, a description will be given of a problem when IGMP/MLD snooping is applied to the switches forming a ring. Here, FIG. 10 is a block diagram illustrating a ring network to which IGMP/MLD snooping is applied in normal operation. FIGS. 11A to 11D are views illustrating the FDBs of the switches after snooping. FIG. 12 is a block diagram illustrating the ring network to which IGMP/MLD snooping is applied immediately after occurrence of a fault. FIGS. 13A to 13D are views illustrating the FDBs of switches after flashing. FIG. 14 is a timing chart illustrating the receiving periods of the terminals.

In FIG. 10, a network 300 includes four switches 10, links 30 for connecting between each of the switches, a router 60 connected to a switch 10-3, and a server 50 connected to the router 60. A switch 10-1 which is a master node of the network 300 periodically sends a health-check frame from a port 40-12. The switches 10 forming the ring forward the health-check frame from one to another adjacent switch 10 in the clockwise direction. The health-check frame is finally received by a port 40-14 of the switch 10-1. Here the port 40-14 of the switch 10-1 is in a BLK state for preventing occurrence of a loop and can receive only the heal-check frame.

The switch 10-1 as the master node recognizes that the ring network 300 is healthy by receiving the health-check frame sent by the switch itself. Conversely, the switch 10-1 recognizes that the ring network 300 has a fault by not receiving the health-check frame within a predetermined period of time.

The server 50 sends a multicast frame (DFMG1) addressed to a multicast group 1 (MG1) to the network 300. However, only a terminal 20-2 connected to the switch 10-1 receives the multicast frame (DFMG1). At this time the switches 10-1 to 10-3 have already snooped.

FIG. 11A shows an FDB 70-1 of the switch 10-1, in which a frame with a destination MAX address of MAC_MG1 is forwarded to a port 40-2 connecting the terminal 20-2. Similarly FIG. 11B shows an FDB 70-2 of the switch 10-2, in which a frame with a destination MAX address of MAC_MG1 is forwarded to a port 40-21 connecting the switch 10-1. FIG. 11C shows an FDB 70-3 of the switch 10-3, in which a frame with a destination MAX address of MAC_MG1 is forwarded to a port 40-32 connecting the switch 10-2. Further FIG. 11D shows an FDB of the switch 10-4, which is in an empty state.

In FIG. 12, it is assumed that a fault occurs in a link 30-23 between the switches 10-3 and 10-2. DFMG1 cannot pass through the link 30-23 and the communication is disabled. Also the health-check frame periodically sent by the switch 10-1 cannot pass through the link 30-23 and the communication is disabled. The switch 10-1 recognizes that the ring network 300 has a fault by not receiving the health-check frame within a predetermined period of time. Upon detection of the fault, the switch 10-1 moves the port 40-14 from the BLK state to the FWD state. The switch 10-1 sends FDB flash frames (FF1 and FF2 in the figures) from its ports 40-12, 40-14 in both directions. The switches 10-2 to 10-4 receive the FDB frames, each of which flashes (clears) a corresponding entry of the holding FDB (Forwarding Database). The switch 10-1 also flashes (clears) the contents of the holding FDB. This state will be described below with reference to FIGS. 13A to 13D.

Figures 13A, 13B, 13C, 13D:
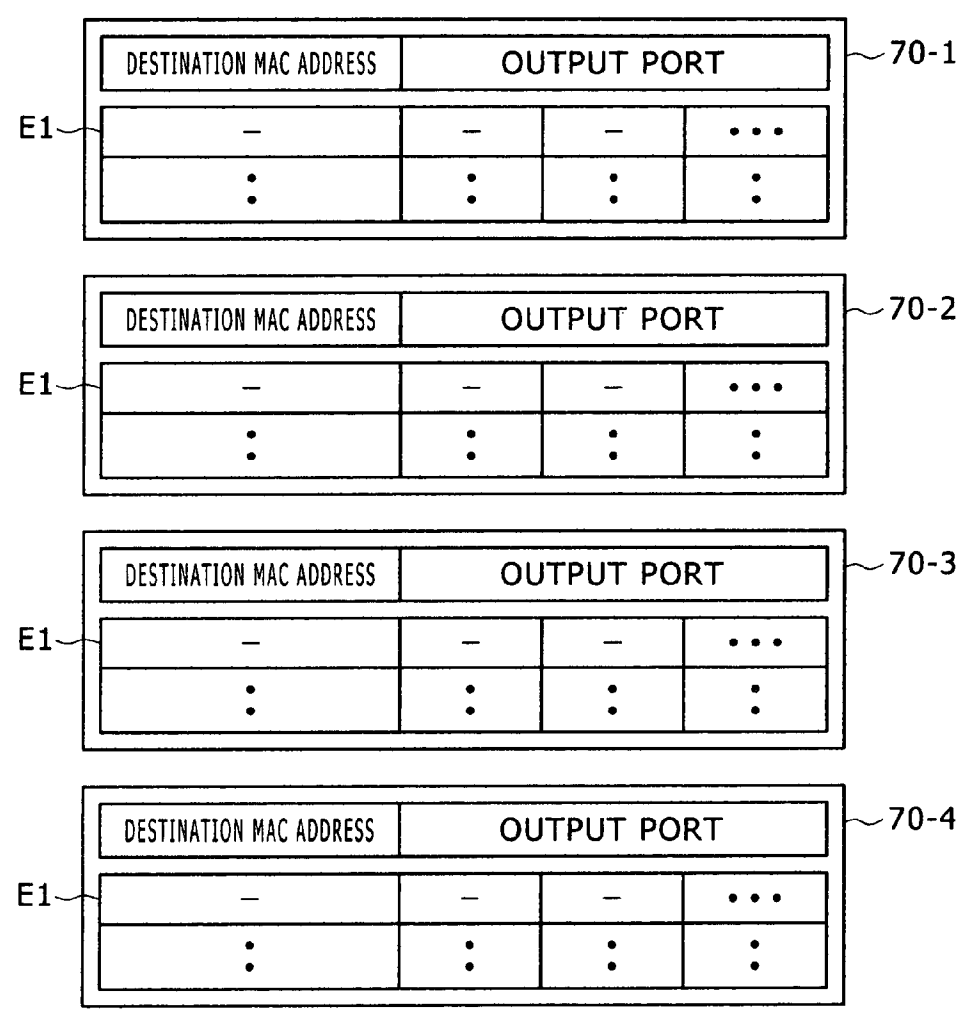

FIG. 13A shows the FDB 70-1 of the switch 10-1, which is in an empty state. Similarly FIG. 13B shows the FDB 70-2 of the switch 10-2, which is in an empty state. FIG. 13C shows the FDB 70-3 of the switch 10-3, which is in an empty state. Further FIG. 13D shows the FDB of the switch 10-4, which remains in the empty state.

Returning to FIG. 12, the FDBs of the nodes (switches) are flashed and all the switches 10-1 to 10-4 are perform flooding, allowing the DFMG1 to reach the terminals 20-1, 20-2, 20-4 and 20-5. Such a state is continued until the switches perform IGMP/MLD snooping. In addition, the timing of performing IGMP/MLD snooping is when the router 60 sends a group join query message downstream and when the terminal 20 sends a group join message in response to the group joint query message. Thus the above state may be continued for a long period of time, causing an increase of traffic and posing a problem from the security point of view.

FIG. 14 is a view illustrating the DFMG1 receiving period of the terminal 20-5, DFMG1 receiving period of the terminal 20-4, DFMG1 receiving period of the terminal 20-2, and DFMG1 receiving period of the terminal 20-1 by arrows in the order from top to bottom, with the elapsed time shown from left to right. Before the fault occurs, only the terminal 20-2 can receive DFMG1. It is assumed that TIME1 is the time of occurrence of the fault in the link 30-23, TIME2 is the flash time of the FDBs of the switches 10, TIME3 is the QRY1 send time of the router 60, TIME4 is the PR1 response time of the terminal 20-2, and TIME5 is the IGMP/MLD snooping time of the switches 10. During the period from TIME1 to TIME2, any of the terminals cannot receive DFMG1. However during the period from TIME2 to TIME5, all the terminals can receive DFMG1. The terminals return to normal operation after TIME5.

EMBODIMENT

Figure 15:
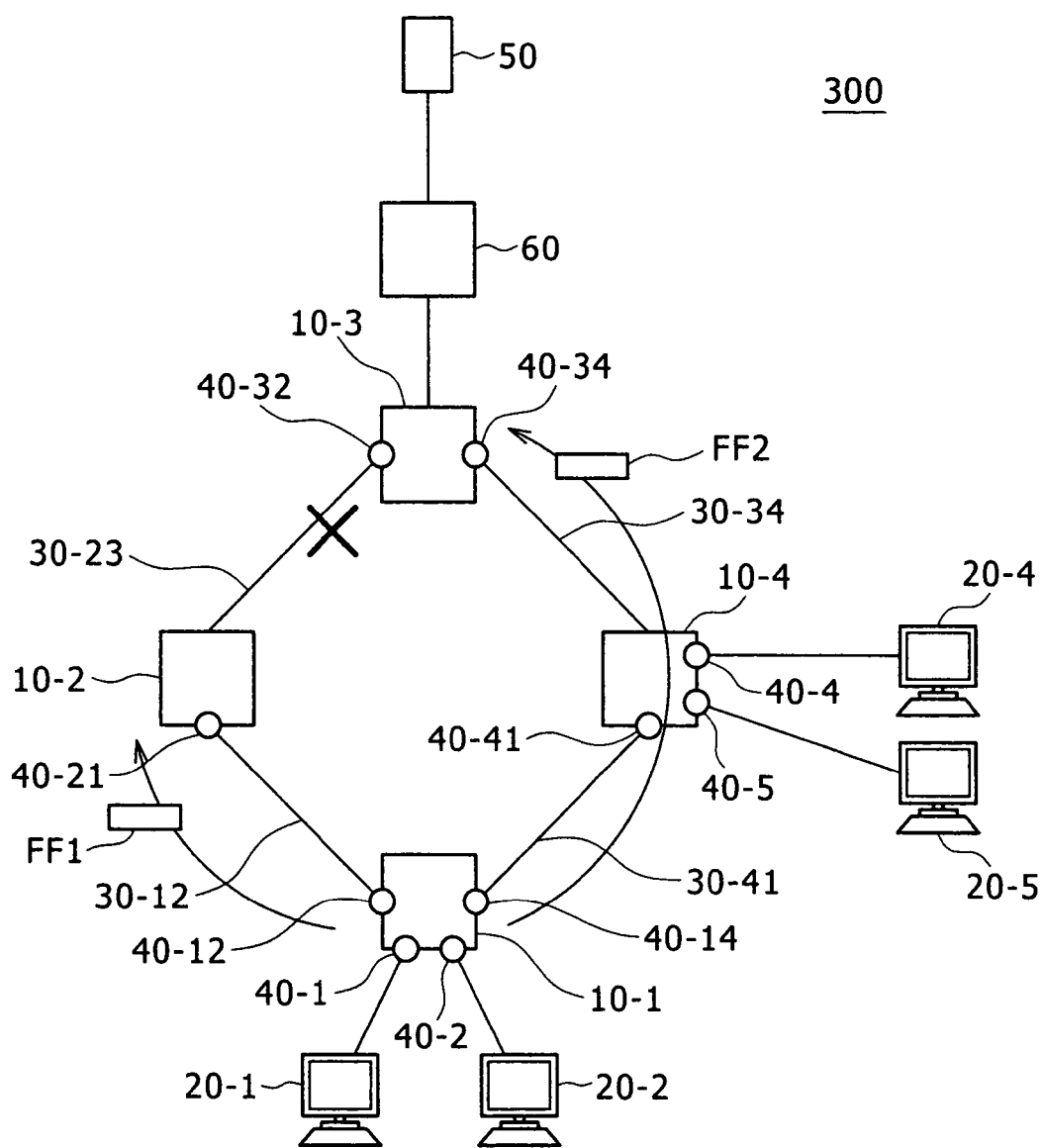
FIG. 15 is a block diagram of the network for illustrating the operation after the master node detects occurrence of the fault.
Figure 16:
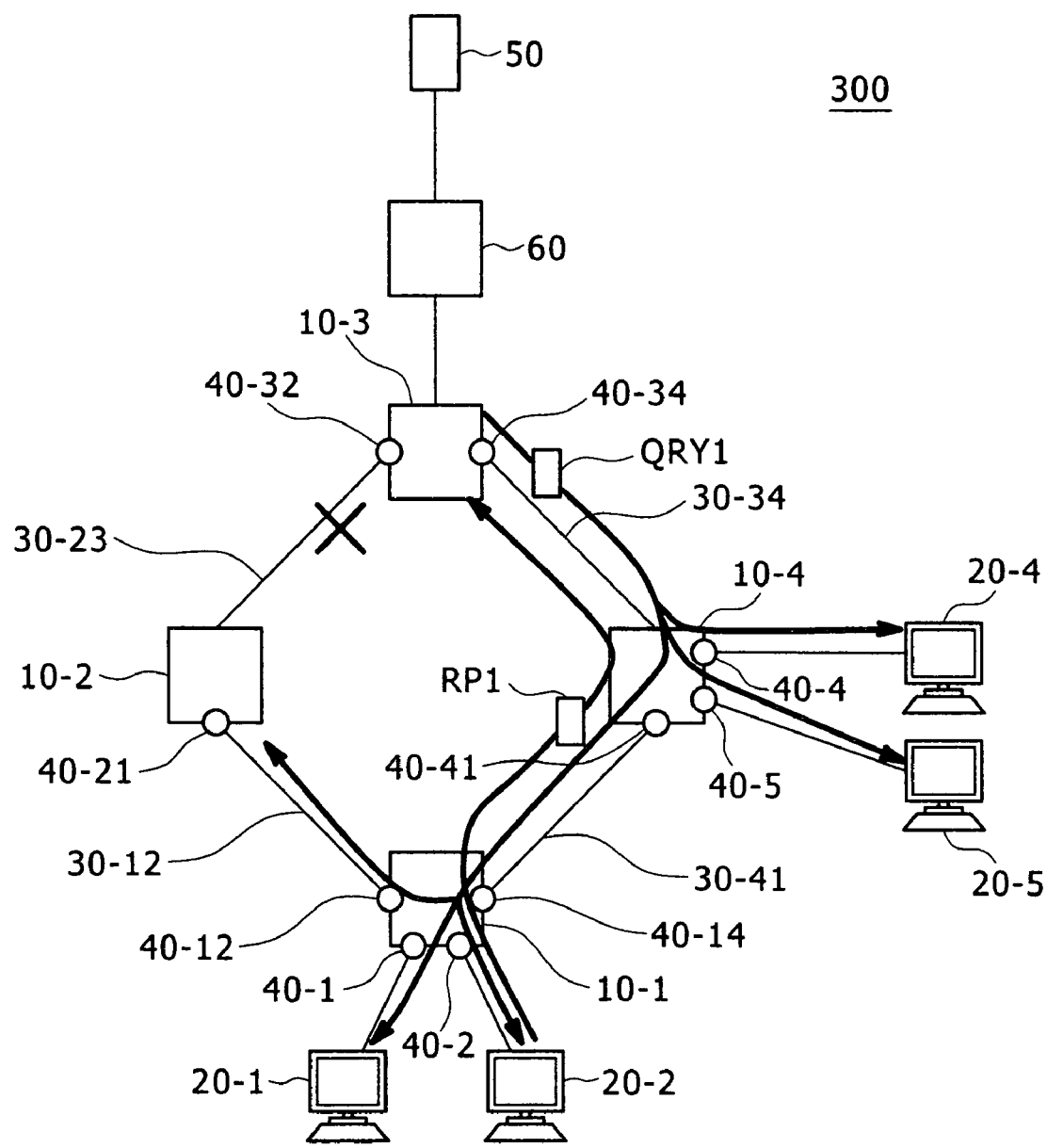
FIG. 16 is a block diagram of the network for illustrating the operation of the switch to which a router is connected.
Figure 18:
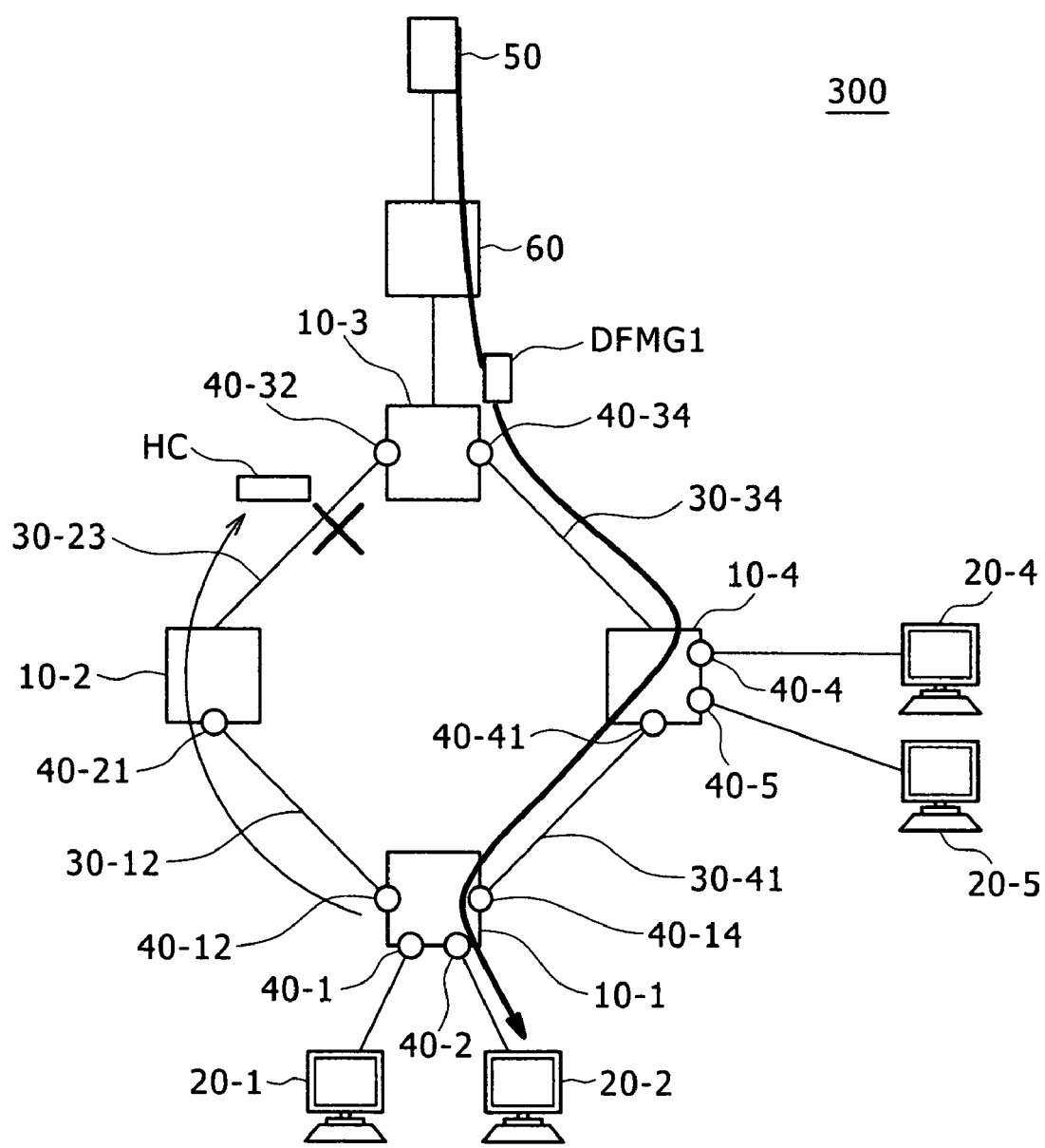
FIG. 18 is a block diagram of the network for illustrating delivery of DFMG1.
Figure 19:
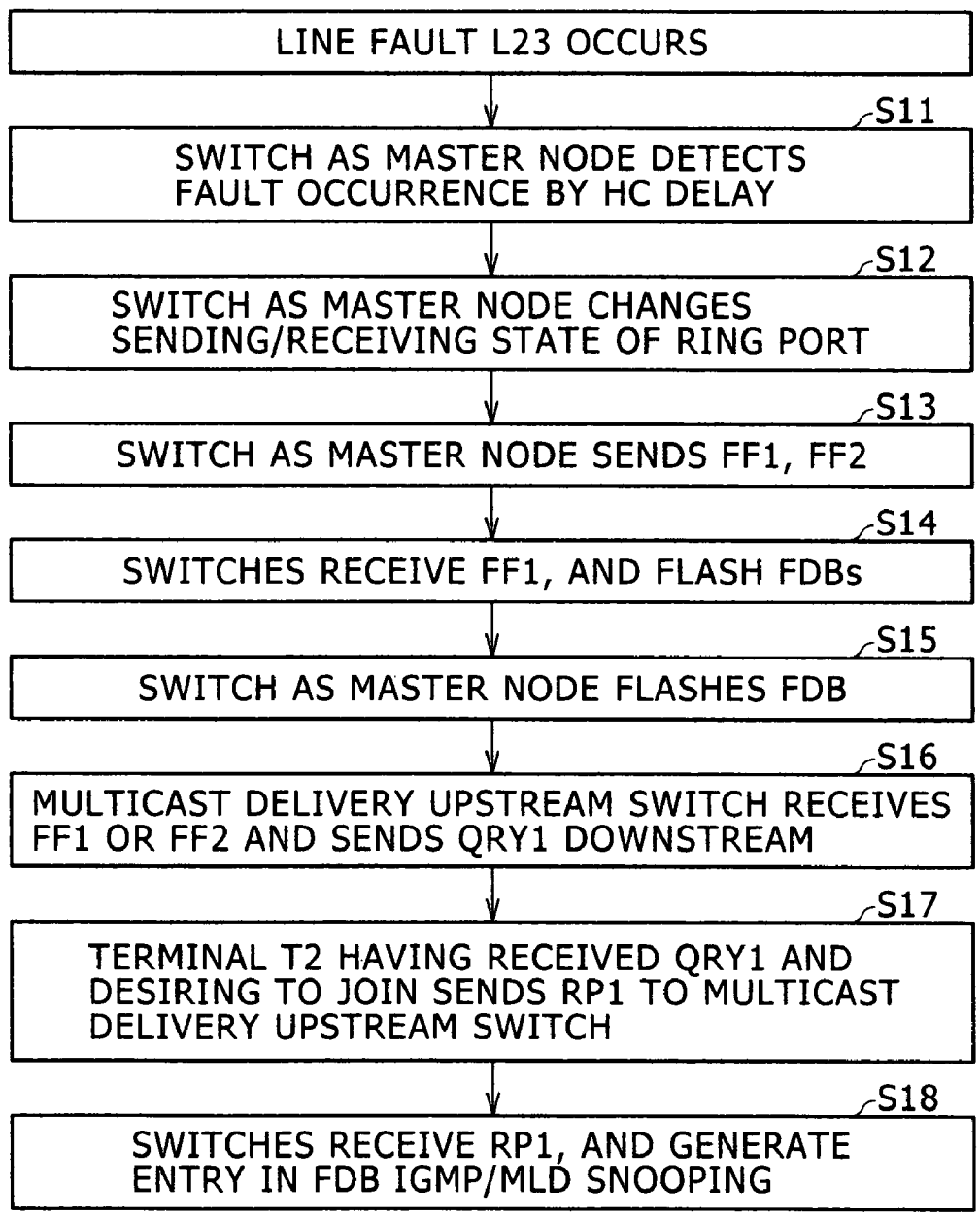
FIG. 19 is a flowchart illustrating the operation of the switches in the network.
Figure 20:
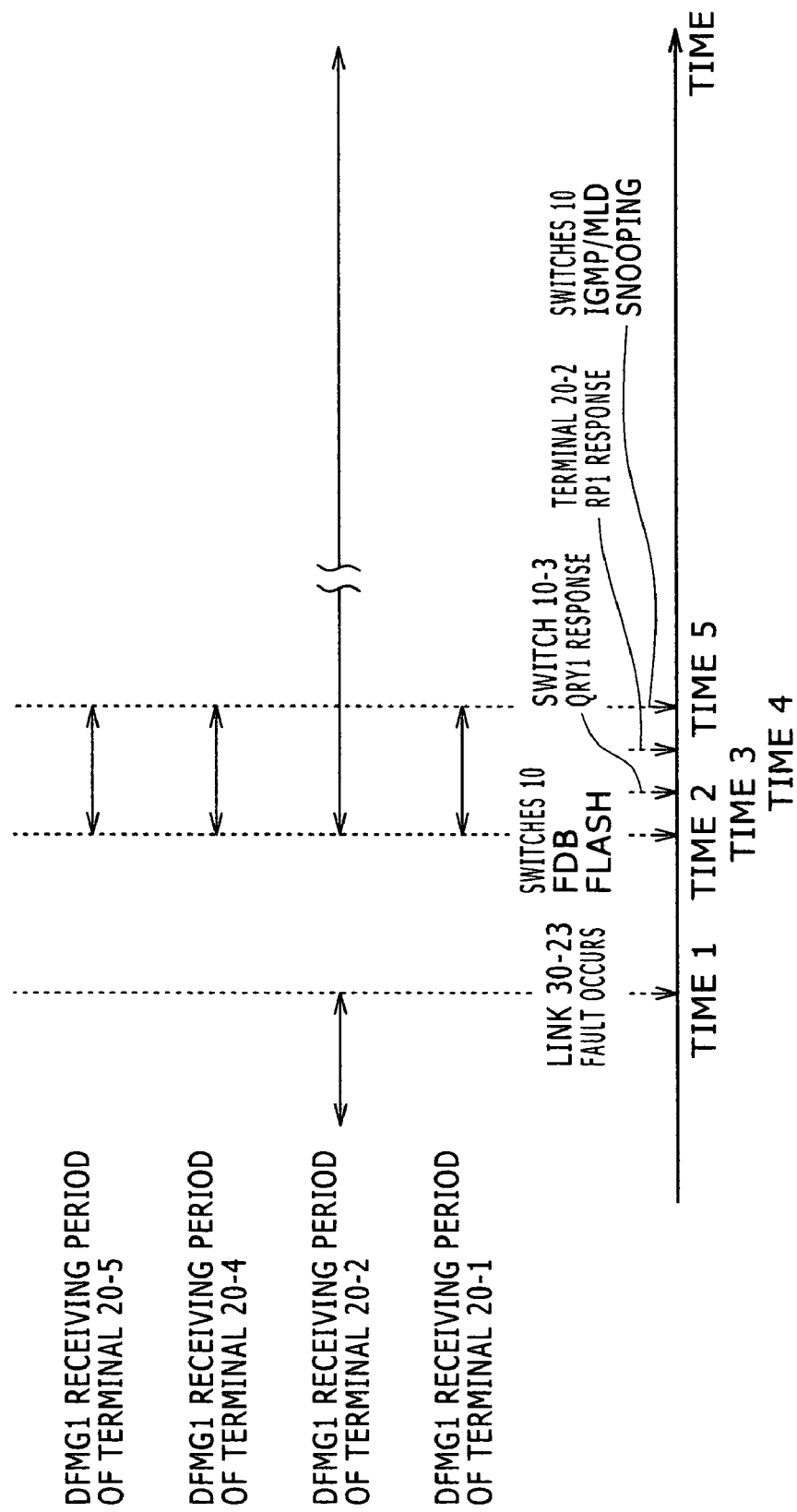
FIG. 20 is a timing chart illustrating the receiving periods of the terminals.
Figure 21:
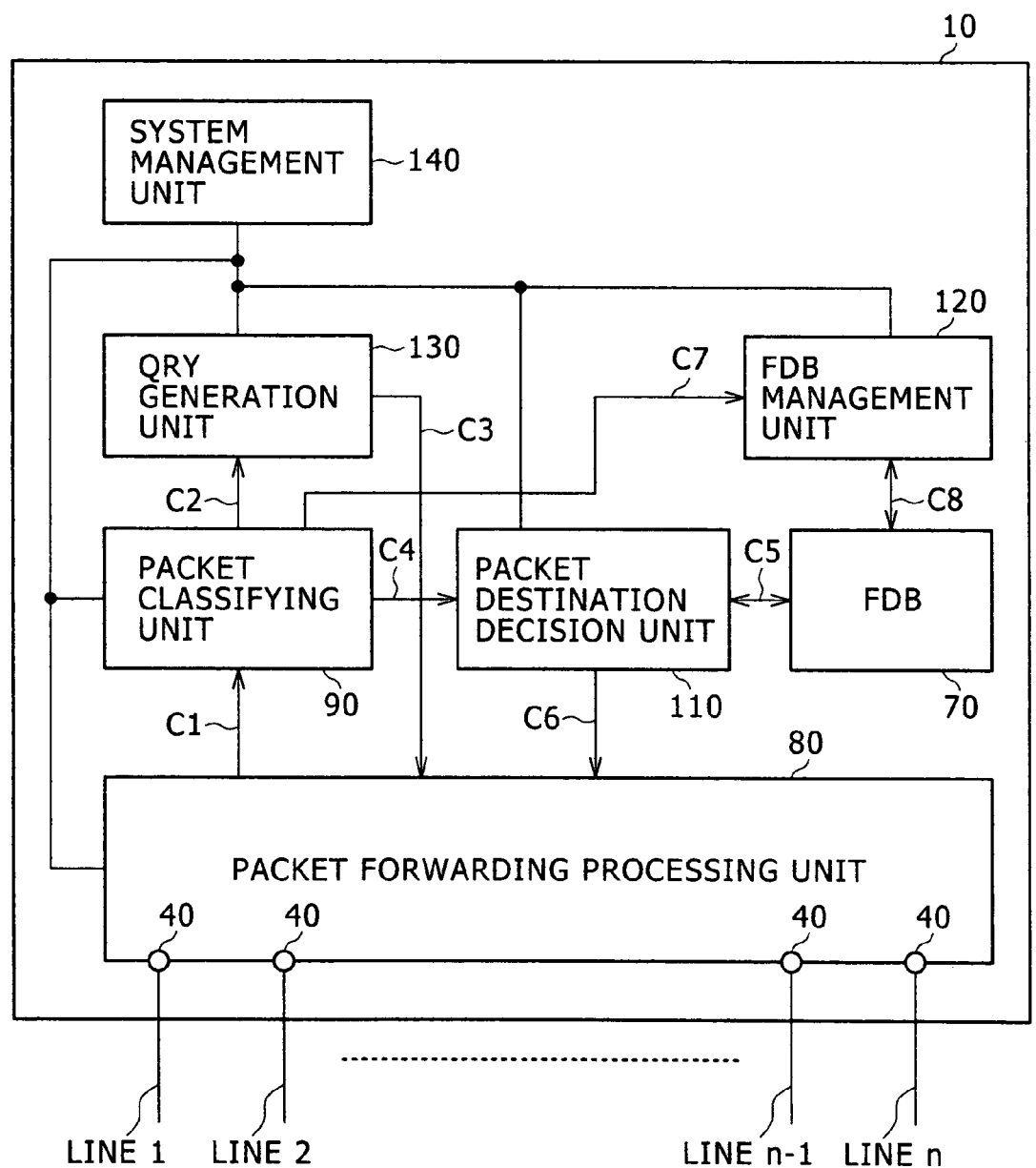
FIG. 21 is a functional block diagram of the switch.
Figure 22:
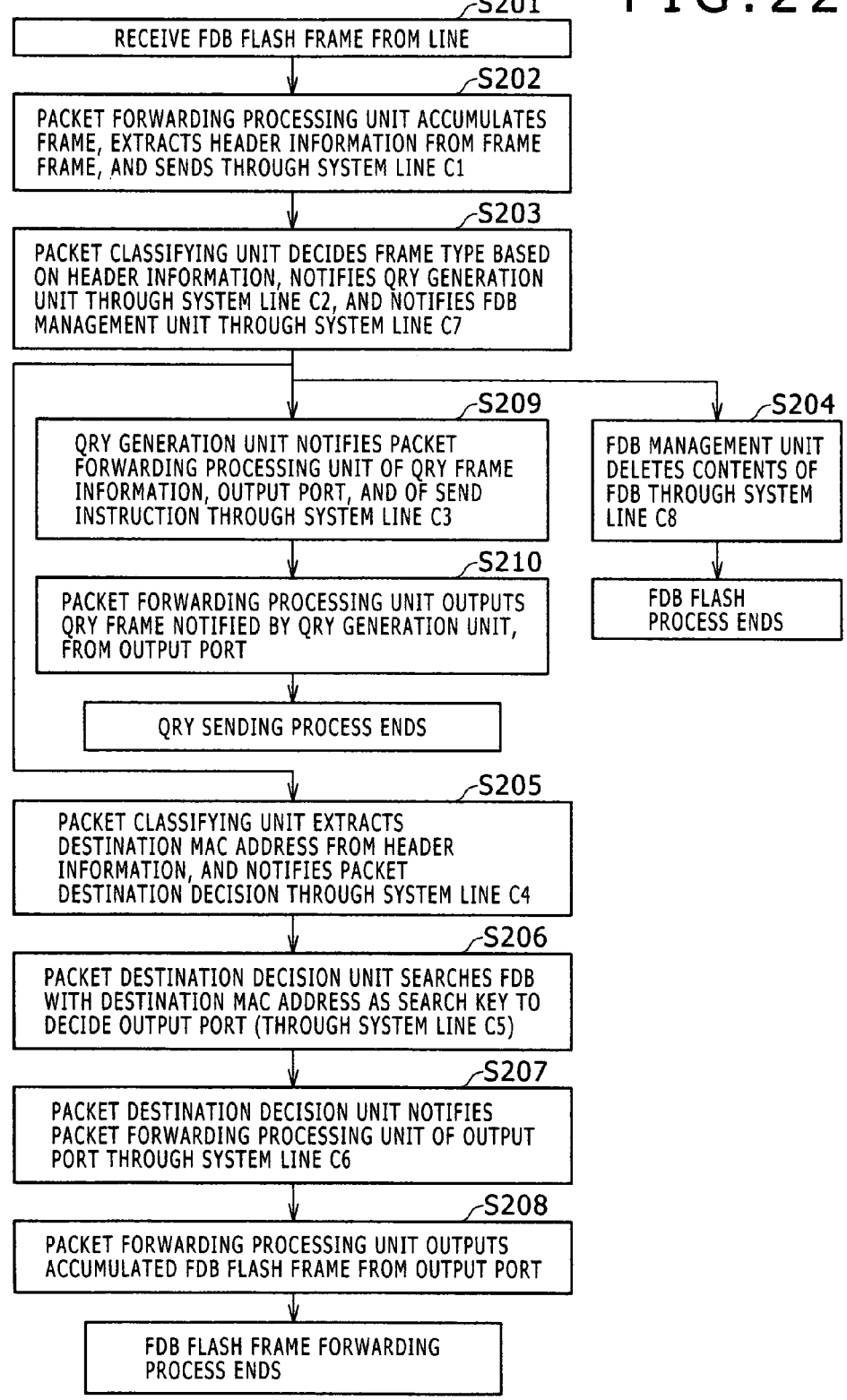
FIG. 22 is a flowchart illustrating the operation of the switch to which the router is connected.
Figure 23:
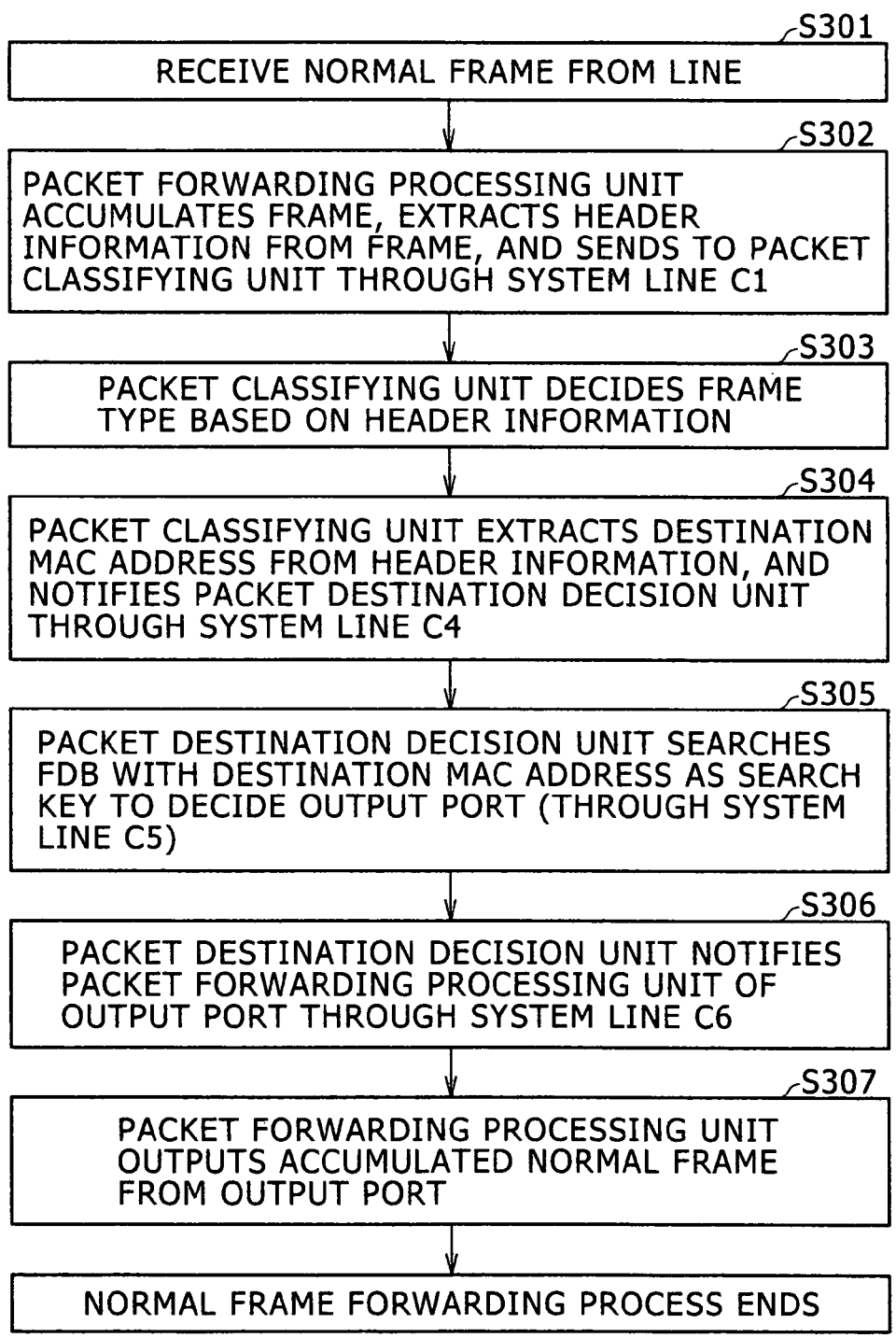
FIG. 23 is a flowchart illustrating the operation of the switch.

An embodiment of the present invention will be described with reference to FIGS. 15 to 23. Here FIG. 15 is a block diagram of the network for illustrating the operation after the master node detects occurrence of a fault. FIG. 16 is a block diagram of the network for illustrating the operation of the switch to which the router is connected. FIGS. 17A to 17D are views of the FDBs of the switches after execution of IGMP/MLD snooping. FIG. 18 is a block diagram of the network for illustrating delivery of DFMG1. FIG. 19 is a flowchart illustrating the operation of the switches in the network. FIG. 20 is a timing chart illustrating the receiving periods of the terminals. FIG. 21 is a functional block diagram of the switch. FIG. 22 is a flowchart illustrating the operation of the switch to which the router is connected. FIG. 23 is a flowchart illustrating the operation of the switch.

In FIG. 15, the switch 10-1 as the master node detects a fault in the ring from the fact that a health-check frame (HC) does not return within a predetermined period of time. Upon detection of the fault in the ring, the switch 10-1 changes the state of the port 40-2 from BLK to FWD, and sends an FDB flash frame (FF1) to the adjacent switch 10-2 and an FDB flash frame (FF2) to the adjacent switch 10-4. The switch 10-4 sends the FDB flash frame (FF2) to the switch 10-3.

In FIG. 16, it is initially set that the router is located in the upstream of the switch 10-3. Upon receiving the FDB flash frame (FF2), the switch 10-3 flashes the FDB and then floods a multicast group join query message (QRY1). QRY1 is further flooded by the switches 10-4, 10-1, and 10-2. In this way QRY1 reaches the terminals 20-1, 20-2, 20-4, and 20-5. Of the terminals 20, the terminal 20-2 connected to the switch 10-1 sends a group join message (RP1) back to the switch 10-3. The switches 10-1, 10-4, 10-3 receive RP1 and perform IGMP/MLD snooping, respectively.

FIG. 17A shows the FDB 70-1 of the switch 10-1, in which a frame with a destination MAC address of MAC_MG1 is forwarded to the port 40-2 connecting the terminal 20-2. Similarly FIG. 17B shows the FDB 70-2 of the switch 10-2, which is in an empty state. FIG. 17C shows the FDB 70-3 of the switch 10-3, in which a frame with a destination MAC address of MAC_MG1 is forwarded to the port 40-34 connecting the switch 10-4. FIG. 17D is the FDB of the switch 10-4, in which a frame with a destination MAC address of MAC_MG1 is forwarded to the port 40-41 connecting the switch 10-1.

In FIG. 18, when the FDBs 70 of the switches are in the state shown in FIGS. 17A to 17D, the server 50 sends a multicast frame (DFMG1) to a multicast group 1 (MG1). Only the terminal 20-2 connected to the switch 10-1 receives the multicast frame (DFMG1). At this time, the terminal 20-2 receives through the switch 10-4 rather than through the switch 10-2 due to the fault in the link 30-23.

Referring to FIG. 19, a description will be given to the operation of the equipment and terminals forming the network 300. In FIG. 19, the switch as the master node detects a fault in the ring from the fact that the HC reception is delayed (S11). The switch as the master node changes the send/receive state of the ring port (S12), and sends the FDB flash frames in both directions (S13). The switches receive the FDB flash frames and flash the FDBs (S14). The switch as the master node also flashes the FDB (S15). The multicast delivery upstream switch receives the FDB flash frame, and sends a listener discovery message (QRY1) downstream (S16). The terminal 20, which received QRY1 and desires to join the multicast group, sends RP1 to the multicast delivery upstream switch (S17). The switches 10 in the transmission path each generate an entry in the FDB by IGMP/MLD snooping (S18). If there is no terminal desiring to join in Step 15, the router 60 stops the delivery.

Next an advantage of the embodiment will be described with reference to FIG. 20. FIG. 20 is a view illustrating the DFMG1 receiving period of the terminal 20-5, DFMG1 receiving period of the terminal 20-4, DFMG1 receiving period of the terminal 20-2, and DFMG1 receiving period of the terminal 20-1 by arrows in the order from top to bottom, with the elapsed time shown from left to right. Before the fault occurs, only the terminal 20-2 can receive DFMG1. It is assumed that TIME1 is the time of occurrence of the fault in the ling 30-23, TIME2 is the FDB flash time of the switches 10, TIME3 is the QRY1 send time of the switch 10-3, TIME4 is the RP1 response time of the terminal 20-2, and TIME5 is the IGMP/MLD snooping time of the switches 10.

As is apparent from a comparison between FIG. 20 and FIG. 14, the FDB flash time (TIME2) of the switches 10 and the QRY1 send time (TIME3) of the switch 10-3 is very close. Thus according to the embodiment, there is an advantage that the period from TIME2 to TIME5 during which all the terminals can receive DFMG1 is very short.

In FIG. 21, the switch 10 includes: a packet forwarding processing unit 80 having n ports 40 connected to n lines (links); a packet classifying unit 90 for deciding the type of the received packet; a packet destination decision unit 110 for searching the FDB 70 based on the decision result of the packet classifying unit 90 and indicating the packet destination to the packet forwarding processing unit 80; the FDB 70; an FDB management unit 120 for updating the FDB 70 based on the decision result of the packet classifying unit 90; a QRY generation unit 130 for generating a query based on the decision result of the packet classifying unit 90 and forwarding to the packet forwarding processing unit 80; and a system management unit 140 for managing the entire system.

Incidentally the QRY generation unit 130 includes an n-stage resister not shown. As a result, the QRY generation unit 130 selects the query generation enabled/disabled for each of the ports 40 at which the FDM flash was received. The FDB management unit 120 flashes the FDB 70 upon receiving the FDM flash. Further the FDB management unit 120 records, upon receiving RP1, the destination MAC address and the port number at which RP1 was received, in the FDB 70.

The operation of the switch 10 of FIG. 21 will be described with reference to FIGS. 22 and 23. In FIG. 22, the packet forwarding processing unit 80 receives an FDB flash frame from the line (S201). The packet forwarding processing unit 80 accumulates the frame, extracts header information from the frame, and sends to the packet classifying unit 90 through a system line C1 (S202). The packet classifying unit 90 decides the frame type based on the header information. In this case, the frame type is the FDB flash frame, so that the packet classifying unit 90 notifies the QRY generation unit 130 through a system line C2. Further, the packet classifying unit 90 notifies the FDB management unit 120 through a system line C7 (S203). The FDB management unit 120 deletes the contents of the FDB through a system line C8 (S204).

After Step 203, the packet classifying unit 90 extracts the destination MAC address from the header information, and notifies the packet destination decision unit 110 through a system line C4 (S205). The packet destination decision unit 110 searches the FDB 70 with the destination MAC address as a search key to decide the output port (through a system line C5) (S206). The packet destination decision unit 110 notifies the packet forwarding processing unit 80 of the output port through a system line C6 (S207). The packet forwarding processing unit 80 outputs the accumulated FDB flash frame from the output port (S208), and then ends the FDB flash frame forwarding process.

After Step 203, the QRY generation unit 130 notifies the packet forwarding processing unit 80 of the QRT frame information, output port, and send instruction through a system line C3 (S209). The packet forwarding processing unit 80 outputs the QRY frame information notified by the QRY generation unit 130 from the output port (S210), and then ends the QRY sending process.

In FIG. 23, the packet forwarding processing unit 80 receives a normal frame from the line (S301). The packet forwarding processing unit 80 accumulates the frame, extracts the header information from the frame, and sends to the packet classifying unit 90 through the system line C1 (S302). The packet classifying unit 90 decides the frame type based on the header information (S303). In this case, the frame type is the normal frame, so that the packet classifying unit 90 does not notify the QRY generation unit 130 and the FDB management unit 120. The packet classifying unit 90 extracts the destination MAC address from the header information, and notifies the packet destination decision unit 110 through the system line C4 (S304). The packet destination decision unit 110 searches the FDB 70 with the destination MAC address as a search key to decide the output port (through the system line C5) (S305). The packet destination decision unit 110 notifies the packet forwarding processing unit 80 of the output port through the system line C6 (S306). The packet forwarding processing unit 80 outputs the accumulated normal frame from the output port (S307), and then ends the normal frame forwarding process.

In the above described embodiment, the service-providing switch (upstream switch) connecting the server 50 is the transit node of the ring network, but it may also be the master noted. In this case, the service-providing switch detects a fault in the ring by the delay of the health-check frame rather than by the reception of the FDB flash frame.

According to the embodiment, even when IGMP/MLD snooping is combined with the ring network in which the fault recovery is performed, unnecessary traffic is converged in a short period of time, and thereby degradation of security can be minimized.

What is claimed is:

1. A switch, comprising:
a packet forwarding processing unit that accumulates a received frame, extracts header information from said frame to send to a packet classifying unit, receives an output port from a packet destination decision unit, and sends the accumulated frame from the output port;
said packet classifying unit that decides a type of said frame based on said header information, extracts a destination MAC address from said header information, and sends to said packet destination decision unit;
a data base that maps the destination MAC address and the output port; and
said packet destination decision unit that decides the output port from said data base by use of said destination MAC address received from said packet classifying unit, and sends to said packet forwarding processing unit,
wherein said switch includes a generation unit that generates a listener discovery message,
wherein said switch flashes entries of said data base upon detection of a fault in a down stream network, and sends said listener discovery message generated by said generation unit to said downstream network.

2. A switch connecting a server on an upstream side and forming a node of a ring network on a downstream side to forward a multicast frame sent to a multicast group from said server by searching a data base that maps a destination MAC address and an output port,
wherein said switch flashes entries of said data base upon detection of a fault in said ring network, and sends a listener discovery message to two adjacent switches forming said ring network.

3. The switch according to claim 1,
wherein said fault detection is performed by reception of a data base flash frame.

4. The switch according to claim 2,
wherein said fault detection is performed by reception of a data base flash frame.

5. The switch according to claim 1,
wherein said fault detection is performed by delay of a health-check frame.

6. The switch according to claim 2,
wherein said fault detection is performed by delay of a health-check frame.

7. A fault recovery method for a network including a first switch, a second switch, and a third switch connected in a ring shape to provide a service, which is provided by a server connected to said first switch, to a terminal connected to any of said plurality of switches, said network fault recovery method comprising the steps of:
detecting a fault in interconnection by any one of said plurality of switches;
sending data base flash frames in two directions by said switch having detected said fault;
flashing entries of data bases upon detection of a fault in said ring network by said plurality of switches; and
sending a listener discovery message to said second switch and said third switch from said first switch.

8. The network fault recovery method according to claim 7,
wherein said fault detection is performed by delay of a health-check frame.

* * * * *

UNITED STATES PATENT AND TRADEMARK OFFICE
CERTIFICATE OF CORRECTION

PATENT NO. : 7,778,266 B2  Page 1 of 1
APPLICATION NO. : 11/703074
DATED : August 17, 2010
INVENTOR(S) : S. Akahane et al.

It is certified that error appears in the above-identified patent and that said Letters Patent is hereby corrected as shown below:

ON THE TITLE PAGE

Please correct (73) Assignee to read as follows:

(73)  ~~Alaxala~~ ALAXALA Networks Corporation,
Kanagawa (JP)

Signed and Sealed this

Second Day of November, 2010

David J. Kappos
*Director of the United States Patent and Trademark Office*